United States Patent [19]

Streit

[11] Patent Number: 4,684,939

[45] Date of Patent: Aug. 4, 1987

[54] LIQUID CRYSTAL DISPLAY DEVICE

[75] Inventor: Peter Streit, Widen, Switzerland

[73] Assignee: U.S. Philips Corporation, New York, N.Y.

[21] Appl. No.: 497,189

[22] Filed: May 23, 1983

[30] Foreign Application Priority Data

Jun. 18, 1982 [CH] Switzerland .......................... 3762/82

[51] Int. Cl.$^4$ ............................................... G09G 3/36
[52] U.S. Cl. .................................... 340/784; 340/765; 350/333; 350/345
[58] Field of Search ............... 340/716, 765, 784, 783, 340/795, 796, 803; 350/333, 337, 338, 339 D, 345

[56] References Cited

U.S. PATENT DOCUMENTS

| | | | |
|---|---|---|---|
| 4,042,920 | 8/1977 | Harsch et al. | 340/765 |
| 4,104,627 | 9/1978 | Thuler | 340/765 |
| 4,139,271 | 2/1979 | Yoda | 350/337 |
| 4,298,249 | 11/1981 | Gloor et al. | 350/338 |
| 4,340,277 | 7/1982 | Kaufmann et al. | 350/337 |
| 4,345,248 | 8/1982 | Togashi et al. | 340/765 |
| 4,440,474 | 4/1984 | Trcka | 350/345 |

Primary Examiner—Gerald L. Brigance
Assistant Examiner—Jeffery A. Brier
Attorney, Agent, or Firm—Paul R. Miller

[57] ABSTRACT

A liquid crystal display device having two linear polarisers and a nematic liquid crystal with positive dielectric anisotropy. The liquid crystal is illuminated by a light source which is arranged in a fixed spatial relationship to the display. Behind the display, a diffusely scattering, metallic reflector is provided. The angle of incidence of the light relative to the perpendicular on the surface of the front carrier plate is in the range from 50° to 90°, preferably between 70° and 80°. The operating voltage of the display device according to the invention is less than 2.0 times the Freedericksz threshold voltage of the liquid crystal. In this way, optimum contrast is achieved, coupled with a very large range of viewing angle. With this display device, very high multiplex rates (up to 1:120) can be reached.

9 Claims, 3 Drawing Figures

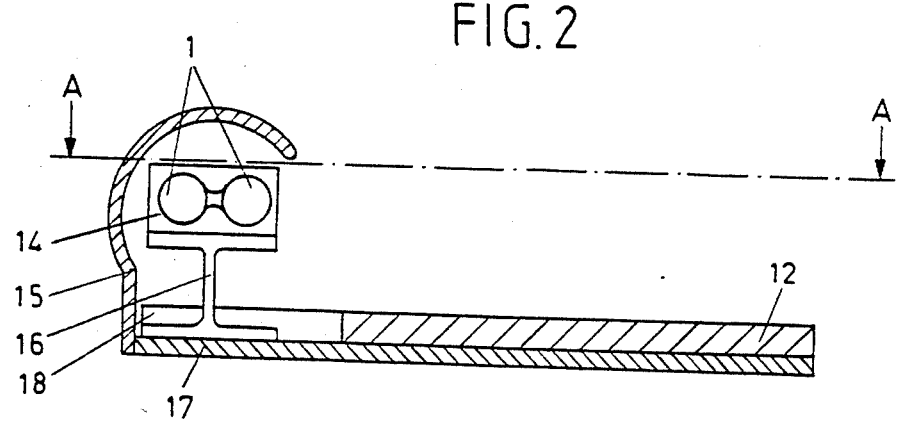
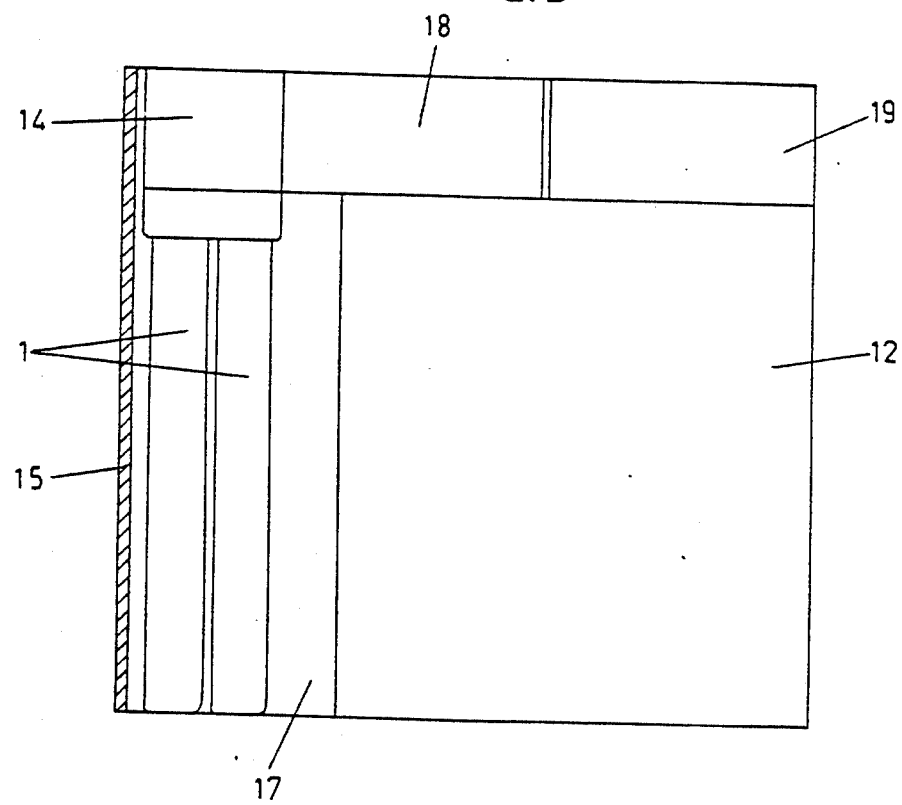

LIQUID CRYSTAL DISPLAY DEVICE

BACKGROUND OF THE INVENTION

1. Field of the Invention

The present invention relates to a liquid crystal display device formed by plane parallel carrier plates each having associated electrodes and linear polarizers, wherein a twisted nematic liquid crystal is provided between the plates to form a cell, and a light source illuminates the cell.

2. Description of the Prior Art

From "Electronic Engineering", volume 46, no. 555 (May 1974), page 17, various types of illumination for liquid crystal displays are known. Initially, the direct and indirect illumination of displays in transmission operation are described. In order to obtain good illumination, the angle of incidence of the light relative to the perpendicular on the surface should be selected not greater than 45°, since otherwise the contrast becomes too small. An angle of incidence of 45° is obtained by means of a louvre foil. In reflection operation, the display device is built into a recess and, evidently, a scattering layer is provided directly in front of the display device. A reflector layer is then fitted behind the display. A black plate is arranged obliquely above the display on the observer side, in order to absorb interfering scattered light. This arrangement is used, for example, in electronic computers.

From IBM Technical Disclosure Bulletin, volume 20, no. 113 of April 1978, a multiplexed liquid crystal display with a large viewing angle is known. It is operated in transmission. This display device comprises two polarisers and a thin scattering foil which is located on the observer side. The display is illuminated with quasi-parallel light incident obliquely. The angle of incidence $90°-\delta$ of the light relative to the perpendicular on the surface is about 20°.

The liquid crystal displays described, which are operated in transmission, have various disadvantages. Firstly, the legibility is considerably impaired if a display is viewed in the direction of the illumination source. Secondly, there is an interfering parallax: for this reason, the angle of incidence relative to the perpendicular on the surface cannot be selected to have any desired magnitude. Additionally, such devices have a multiplex rate which is not particularly large (up to about 1:30). The use of a scattering foil has the effect that only about half of the incident light is transmitted. As a result, the readability is considerably impaired.

The known reflective display has the disadvantage that it requires a fairly involved arrangement. In addition, the scattering layer considerably reduces the contrast and the black absorption plate restricts the visual range quite significantly. Such a display also has low multiplex rates.

SUMMARY OF THE INVENTION

It is therefore the object of the invention to improve a liquid crystal display device of the abovementioned type in such a way that the display is highly multiplexible, has optimum contrast and can be observed over a large range of viewing angle.

This and other objects are achieved according to the invention by providing a novel multiplexible liquid crystal display device, including a cell having two plane-parallel transparent carrier plates on the inner faces of which transparent electrode layers are located, and two linear polarisers; a twisted nematic liquid crystal with positive dielectric anisotropy located in the cell; a light source which is arranged in a fixed spatial relationship to the display and which illuminates the display directly with obliquely incident quasiparallel light; a diffusely scattering, metallic reflector provides behind the cell; the light source being arranged such that the angle of incidence of the light relative to the perpendicular on the surface of the front carrier plate is in the range from 50° to 90°; and a drive circuit for applying an effective operating voltage to selected electrode operating voltage is less than 2.0 times the Freedericksz threshold voltage of the liquid crystal.

FIG. 1 in a cross-sectional view showing the principle of arrangement of a liquid crysta display device according to the invention;

FIG. 2 in a side view, partially in cross-section, of a display screen with illumination for graphical displays; and FIG. 3 is a top view of the arrangement of FIG. 2 along the section A—A.

DESCRIPTION OF THE PREFERRED EMBODIMENTS

Figure 1:
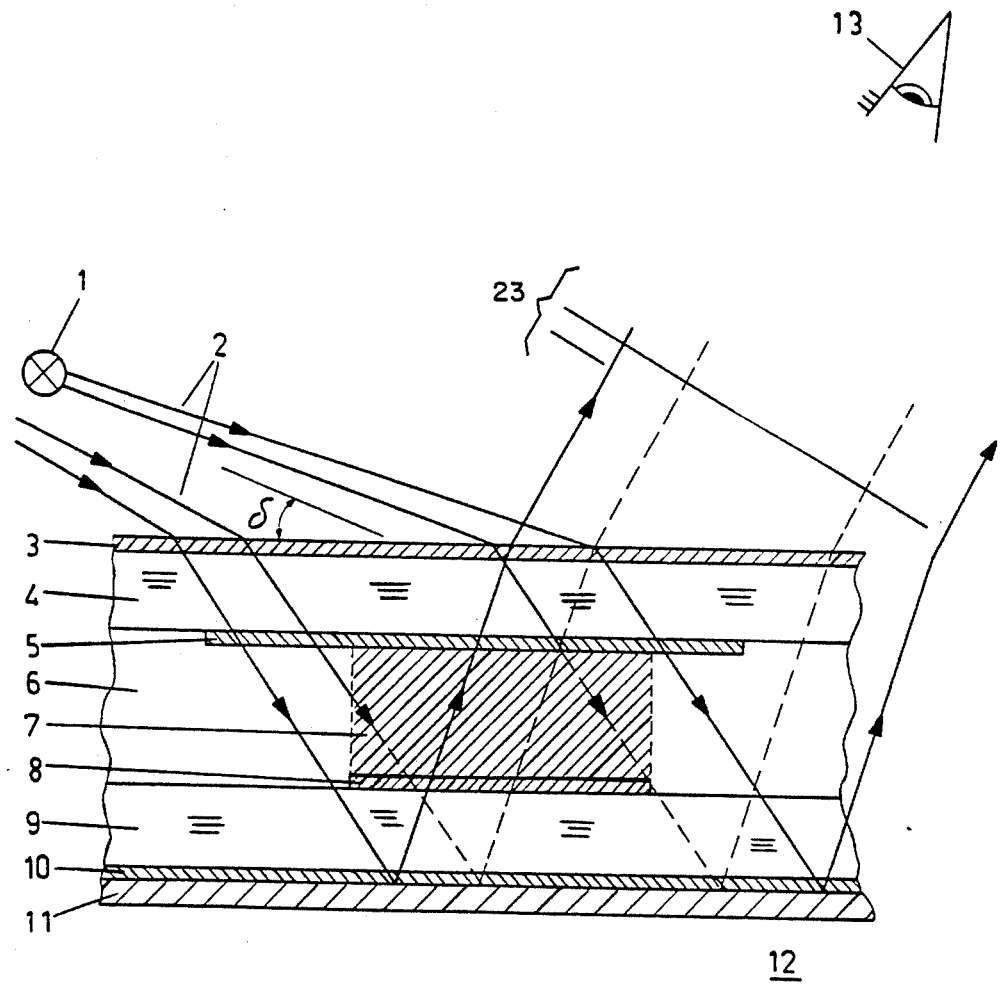

Referring now to the drawings, wherein like reference numerals designate identical or corresponding parts throughout the several views, and more particularly in FIG. 1 thereof, FIG. 1 shows a liquid crystal cell 12 having an illumination source 1 which illuminates the display with quasi-parallel light beams 2 under a mean angle of $90°-\delta$ relative to the perpendicular on the surface. Those light beams are termed quasi-parallel which have a deviation of up to about 10° from parallelism. The cell 12 consists of a front linear polariser 3, a front carrier plate 4, a rear carrier plate 9 and a rear linear polariser 10. On the inner faces of the front and rear carrier plates 4 and 9, front and rear electrode layers 5 and 8 are located. Reference numeral designation 7 indicates the driven range of the display. A reflector 11 is fitted behind the cell 12.

In FIGS. 2 and 3, a liquid crystal cell 12 is arranged as a display screen. The illumination source 1 is a gas discharge lamp which is ignited by a starter 14. The lamp 1 and the starter 14 are mounted on a H-shaped carrier element 16. A reflecting hood 15 is arranged above the lamp 1 in such a way that the display is illuminated with quasi-parallel light. The complete arrangement is mounted on a base plate 17, on which also a conventional electronic drive circuit 18 is located which is arranged integrally in one or more components, in the known manner. The drive circuit 18 is known, for example, from "Electronik" 1974, no. 5, pages 167–170, and additionally comprises a voltage source known per se. A circuit 19 with an optical sensor is located next to the drive circuit 18.

The fundamental mode of operation of liquid crystal displays in accordance with the principle of the twisted cell is generally known, for example from "Physik in unserer Zeit (Physics in our Time)", 1975, no. 3, pages 66–77. The liquid crystal 6 is here nematic and has a positive dielectric anisotropy. According to the invention, the electrode layers 5 and 8 are then driven with a voltage of less than 2.0 times the Freedericksz threshold voltage of the liquid crystal 6. The Freedericksz threshold voltage $V_{th}$ is explained in detail, for example, in Appl. Phys. Lett. 18 (1971) 127. From the article, $(4\pi)^{-1}(\delta_{11}-\epsilon_1)$ $V_{th}^2 = K_{11}(\pi/2)^2 + (k_{33}-2k_{22})\phi_o^2$, where, in cgs units, $k_{11}$, $k_{22}$, and $k_{33}$ are the elastic moduli for splay, twist, and bend, respectively and $\phi_o$ is the twist angle. In measurement methods, $V_{th}$ results as the voltage at which a change in the capacitive effect of the liquid crystal just appears (compare FIG. 2 of the article). At voltages slightly higher than $V_{th}$, an optical effect of the liquid crystal is observed from a specific direction fixed by the orientation of the interface molecules. This direction is strongly inclined relative to the perpendicular on the surface. Only at voltages substantially higher than $V_{th}$, this effect gradually changes to an effect which is visible over wide ranges of solid angle. The invention exploits this property of the twisted cell at low operating voltage. The quasi-parallel, obliquely incident light is absorbed in the driven region 7, so that a visible shadow image is produced on the reflector 11, as shown in FIG. 1 with the light beams 2. The display is thus illuminated precisely from that direction from which otherwise, with diffuse illumination, optimum contrast for the observer is achieved. This does not mean anything other than an internal projection of the driven region 7, a kind of beam reversal. As shown by the conoscopic image of the display, the driven region 7 is not visible in a very large range of viewing angle. The otherwise interfering parallaxes therefore no longer rise at all. The electrode layers 5 and 8 are here of course made from a transparent material, for example of $SnO_2$. Since the tilting of the molecules of the liquid crystal 6 at the operating voltage according to the invention is much lower than normal, very high multiplex rates (up to 1:120 can be achieved. The angle of incidence of the light relative to the perpendicular on the surface of the front carrier plate 4 is then selected in such a way that the ratio between the slope of the contrast curve $dK/dU$ and the voltage U in the non-driven state $U_{off}$ for the liquid crystal 6 becomes a maximum. The contrast is here designated K. Contrast curves for reflective displays and electronic drive systems of multiplex operation are known, for example, from "Electronic Application Bulletin" 35, no. 4 (February 1979) 172–187. According to the invention, the angle range of the illumination light is therefore between 50° and 90° relative to the perpendicular. Preferably, however, the range from 70° to 80° should be selected since, in this range, the requirements on the parallelism of the light can be much less stringent and the light source 1 nevertheless illuminates the display with sufficient uniformity.

A display having a display screen for graphical purposes is shown in FIGS. 2 and 3. The display screen is a matrix display device with 200×400 image points. Each image point is a square of 0.4 mm side. The total image area is therefore 8×16 $cm^2$. As the liquid crystal, ZLI 1957 from Messrs. E. Merck, Darmstandt (Germany), is used. This substance has a Freedericksz threshold voltage of 1.45 volt. The operating voltage is here selected to be between 2.0 and 2.1 volt. The matrix electrodes are driven in the way known from "IEEE Transactions on Electron Devices", volume ED-21, no. 2 (February 1974) 146–155. The reflector 11 has a sawtoothed pattern and is known per se from German Offenlegungsschrift No. 2,901,580. the angle of inclination, described therein, is calculated by means of the equation $\alpha = (90° - \delta)/2$, $90° - \delta$ being the angle of incidence of the light relative to the perpendicular on the surface (pages 12–13, FIG. 9). It would, however, also be possible to select the angle $\alpha$ in such a way that the angle of the reflected light bundle 23 does not coincide with the perpendicular on the surface. This is the case for displays which can only be viewed obliquely. Such a reflector is therefore particularly suitable for asymmetrical illumination, as in the invention. The PL-11 W gas discharge lamp from Messrs. Philips, Eindhoven (Netherlands), is particularly suitable as the light source. It is 19 cm long, 2.5 cm wide and 1.5 cm high. The associated starter 14 has dimensions of 3×4×2 $cm^3$ and is manufactured by Messrs. M. Hauri AG, Bischoffszell (Switzerland). This lamp has a power consumption of 11 watt and a burning life of 5,000 hours. The reflecting hood 15 is formed as a concave, metallic mirror in the region of the gas discharge lamp 1, so that the display is illuminated with quasi-parallel light. In this case, the angle of incidence of the light relative to the perpendicular on the surface is 75°. The electronic drive circuit 18 and the associated voltage source are generally known, so that these do not have to be explained further at this point. The above-described graphical display is above all suitable for use in the EDP sector. The power consumption of such a display is substantially lower than that of the conventional video terminals operating with electron beam tubes.

Since the display according to the invention still has excellent contrast even in the presence of some interfering surrounding light, the display is very suitable for use at almost any working place. In order to detect the irradiance of the surrounding light, the circuit 19 with an optical sensor is provided next to the electronic drive circuit 18. When the surrounding light is unduly interfering, operation is switched over to the normal mode, by switching off the illumination and increasing the operating voltage of the display to at least 2.0 times the Freedericksz threshold voltage. The display can then be multiplexed only to a relatively low degree. Such a combined display would be very suitable for the instrument panel of a motor vehicle.

However, the invention is not restricted to the example given. It would also be possible, for example, to coat the light source 1 directly with a linear polariser, so that the quasi-parallel light is polarised. In this case, the front linear polariser 3 of the cell 12 is omitted, and a scratch-resistant front of the display is obtained. Such a use is particularly suitable in displays of an aircraft instrument panel.

Even though the type of illumination described in the illustrative embodiment is very suitable, the invention is not in principle restricted thereto. For example, it would also be possible to fit a convex lens in front of the light source 1, whereby likewise quasiparallel light is generated. Or, it would be possible to arrange a concave mirror and a light source on the two different sides of the display, as indicated in a sketch in "Electronic Engineering" volume 46, no. 555 (May 1974), page 17.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multiplexible liquid crystal display device, comprising:
 a cell having front and rear plane-parallel transparent carrier plates each having an inner face on which respective transparent electrode layers are located, said electrode layers having opposed segments, and each having an associated linear polariser;

a twisted nematic liquid crystal with positive dielectric anisotropy located in the cell;

a light source arranged in a fixed spatial relationship to the cell for illuminating the display directly with obliquely incident quasiparallel light;

a diffusely scattering, metallic reflector disposed behind the rear carrier plate;

said light source disposed such that the angle of incidence of the light relative to the perpendicular to the surface of the front carrier plate is in the range from 50° to 90° such that the display is illuminated from that direction from which, with diffuse illumination, optimum contrast for an observer is achieved;

drive means for applying an effective operating voltage to selected electrode segments to switch on said selected electrode segments, wherein the effective operating voltage applied to the switched-on segments is less than 2.0 times the Freedericksz threshold voltage of the liquid crystal, and a circuit having an optical sensor for switching off said light source as a function of the irradiance of the surrounding ambient light, and for increasing the operating voltage to at least 2.0 times the Freedericksz threshold voltage.

2. A liquid crystal display device according to claim 1, comprising:
the electrode layers arranged in a matrix.

3. A liquid crystal display device according to claim 1, comprising:
said light source disposed such that the angle of incidence of the light relative to the perpendicular to the surface of the front carrier plate is in the range from 70° to 80°.

4. A liquid crystal display device according to claim 1, comprising:
the reflector having a surface provided with a saw-toothed pattern;
said saw-toothed pattern surface facing the light source.

5. A liquid-crystal display device according to claim 2, wherein said drive means comprises:
means for multiplexing said electrode segments with a multiplex rate greater than or equal to 1:100.

6. A liquid crystal display device according to claim 1, wherein said drive means comprises:
means for applying an effective operating voltage less than 1.6 times the Freedericksz threshold voltage of the liquid crystal.

7. A liquid crystal display device according to claim 1, comprising:
the linear polariser associated with the front carrier plate located on the light source.

8. A liquid crystal display device according to claim 1, comprising:
said drive means applying an operating voltage between 2.0 and 2.1 volt; and
said light source disposed such that the angle of incidence of the light relative to the perpendicular to the surface of the front carrier plate is of the order of 75°.

9. A liquid crystal display device according to claim 1, wherein the light source comprises:
a gas discharge lamp having an electric power of less than or equal to 20 watt.

* * * * *